Patented Dec. 15, 1953

2,662,897

UNITED STATES PATENT OFFICE 2,662,897

REVERSIBLE SOLVENT-SOLUBLE DERIVATIVES OF PHTHALOCYANINE COMPOUNDS

Charles John Pedersen, Salem, N. J., assignor to E. I. du Pont de Nemours and Company, Wilmington, Del., a corporation of Delaware No Drawing. Application October 19, 1951, Serial No. 252,189

10 Claims. (Cl. 260—314.5)

1

This invention relates to novel, solvent-soluble leuco derivatives of copper-phthalocyanine and related pigments. It is an object of this invention to produce novel compounds of the above class which are characterized by economy of production, stability in storage, and general adaptability for industrial use, as for instance in the dyeing or printing of textile fibers. Various other objects and achievements of this invention will appear as the description proceeds.

It is well known that the phthalocyanines are sensitive to oxidizing agents, which generally disrupt the macrocyclic structure, producing phthalimide or related degradation products (Linstead et al., J. C. S. 1934, pages 1033–1038). It has also been known that under special conditions certain colors of the phthalocyanine series may be oxidized to an intermediate, reversible stage. Thus, A. H. Cook (J. C. S., 1938, pages 1763–1778) described certain brown-colored, intermediate oxidation products of iron phthalocyanine when the latter was brought into contact with hydrogen peroxide or the alpha-peroxide of tetralin. Linstead et al. (J. C. S. 1950, 2981) observed the formation of purple or brown intermediate oxidation products when metal-free phthalocyanine was treated with ceric sulfate in aqueous suspension.

The intermediate, reversible oxidation products thus obtained have different solubility characteristics than the generally insoluble parent materials. They have none of the pigment properties of the initial material, having exchanged the characteristic intense reddish-blue to greenish blue color of the phthalocyanine pigment for an unstable violet color in some cases, or a reddish brown color in others. But unlike the end products of degradative oxidation, the intermediate oxidation stages have the remarkable property of regenerating the original color upon being treated with reducing agents or upon heating.

Linstead et al. suggested a structure for the intermediate oxidation product, which may be expressed by the equation:

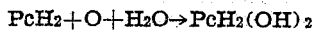

PcH$_2$ in this formula stands for dihydrogen phthalocyanine, that is "metal-free phthalocyanine."

According to Cook, out of 38 metal-phthalocyanines tried besides FePc, all were inactive toward hydrogen peroxide except the phthalocyanines of chromium and cobalt, which were feebly active. None of Cook's reversible oxidation products have apparently been isolated in substance and Linstead indicated that his products underwent reduction, to regenerate a phthalocyanine color, when an attempt was made to crystallize them from organic solvents.

The idea occurred to me that if the oxidative treatment of phthalocyanines could be modified so as to be applicable to the more common commercial phthalocyanines in the first place, e. g., CuPc (Pc standing for the word "phthalocyanine"), to produce readily isolable compounds in the second place, and to enable the entire process to be achieved with economical materials and by an economical procedure, new products of extreme industrial value might be thus produced.

For instance, the new products might be applicable to the dyeing or printing of textile material, by a process which would involve first impregnating the fiber with a solution of the intermediate, essentially colorless, products and then treatment of the fabric with reducing agents or heat to regenerate the color on the fiber. Such a dyeing process would resemble the process of dyeing with vat colors, except that whereas vat colors are reduced to make them soluble and are oxidized to regenerate the color, the reverse is true in the case of the phthalocyanines. Because of this analogy, furthermore, it will be convenient hereafter to refer to the intermediate, reversible oxidation derivatives of the phthalocyanine colors as leuco-phthalocyanine compounds, it being remembered, however, that the leuco-phthalocyanine is an oxidation product whereas the leuco-vat dyes are reduction products.

Now I have found that leuco-phthalocyanine compounds, of valuable, practical qualities, are obtained by treating copper phthalocyanine and other pigments of the phthalocyanine series with a diacyl peroxide such as dibenzoyl peroxide or its nuclear halogen derivatives, for instance, p,p'-dichlorobenzoyl peroxide or bis (2,4-dichlorobenzoyl)-peroxide.

The reaction is preferably carried out at room temperature in a non-aqueous medium which is itself inert toward benzoyl peroxide, for instance ethylene-glycol-monoethyl ether, benzene or chloroform. Cooling with ice may be applied, if desired, at the expense of speed of reaction, of course. On the other hand, warming, say up to 50° C., may be resorted to, provided precautions are taken to keep the speed of reaction under control.

The reaction is believed to introduce two acyloxy radicals into the pigment molecule, the radicals being apparently attached to C-atoms of the pyrrole rings. The intermediate oxidation product then, in the case of copper phthalocyanine for instance, presumably corresponds to the following formula:

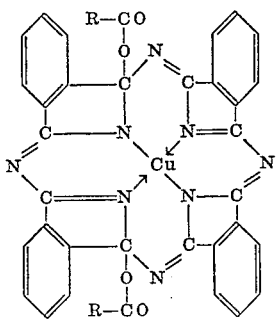

wherein R—CO designates the acyl radical of the peroxide employed.

It is believed that the forces which normally give the phthalocyanine molecule a planar structure are disrupted by the entry of the two substituents indicated, as a result of which the atoms undergo spatial reorientation, disrupting valence-bond resonance. This theory may account for the radically changed properties of the intermediate oxidation product and for its ready reversibility to the parent material upon heating or upon treatment with reducing agents.

The intermediate leuco products aforementioned are characterized first of all by loss of the characteristic blue or greenish blue color of the parent material. The leuco compounds are relatively colorless compared to the parent materials, and they have no tinctorial or pigmentary powers whatever.

Also, whereas phthalocyanines in general are insoluble in most organic solvents, the novel leuco compounds are readily soluble in common organic solvents, such as ethylene-glycol-monoethyl or monomethyl ether, chloroform or acetone, producing generally brown solutions.

They are insoluble in water and, if synthesized in a water-miscible solvent, they may be precipitated out of their reaction mass by drowning the latter in water. They may also be isolated by crystallization or by evaporating the solvent. In solid form, they are sufficiently stable to permit their storage and shipment in commerce for practical, industrial uses.

When heated in dry state or in a suitable solvent they regenerate the original phthalocyanine material, in the case of those phthalocyanines which are stable as to their metal content, for instance copper, nickel or dihydrogen phthalocyanines. In the case of magnesium phthalocyanine, however, demetallization occurs and the regenerated color is metal-free phthalocyanine.

The temperature required for regeneration of the color by heating will vary with the nature of the metal in the complex compound, and with the degree of purity of the latter. In some cases it may be as high as 160° to 225° C. The regeneration of color may, however, be also achieved at lower temperatures by treating the leuco compounds with aqueous, alcoholic, or aqueous-alcoholic solutions of reducing agents. As instances of suitable reducing agents may be mentioned sodium sulfide, sodium or potassium sulfite, sodium or potassium bisulfite, sodium hydrosulfite, zinc formaldehyde sulfoxylate, stannous chloride, sulfur dioxide, hydriodic acid, ascorbic acid, hydrazine hydrate, and hydroxylamine.

Because of the above characteristic reversible properties, my novel compounds are useful in the dyeing or printing of textile fibers, as more fully discussed and illustrated in the examples hereinbelow.

Without limiting my invention, the following examples are given to illustrate my preferred mode of operation. Parts mentioned are by weight.

Example 1

To 25 parts of finely divided copper phthalocyanine in 250 parts of chloroform were added 10 parts of dibenzoyl peroxide. The mixture was agitated at 26° C. for forty-eight hours and then filtered. The filter cake was washed with 100 parts of hot "Cellosolve" (glycol monoethyl ether) and the washings were added to the chloroform filtrate. The chloroform was removed in vacuo and the remaining material was drowned in 2000 parts of water. A yellow-brown precipitate was isolated by filtration, washed with water, and dried without heating. Upon reduction for fifteen minutes with 10 parts of ascorbic acid in 200 parts of ethanol at the boiling point it gave 5.1 parts of copper phthalocyanine.

Example 2

To 25 parts of finely divided semi-chloro copper phthalocyanine in 250 parts of ethyleneglycol-monomethyl ether were added 10 parts of di-benzoyl peroxide. The mixture was agitated at 26° C. for forty-eight hours and then filtered. The reddish brown filtrate contained the oxidation product, from which 17.9 parts of semichloro copper phthalocyanine were recovered by adding 10 parts of ascorbic acid and heating at 100° C. for fifteen minutes. The reduction may also be accomplished by boiling the filtrate for fifteen minutes with 10 grams of sodium sulfide.

If desired, the intermediate leuco-compound may be isolated in substance, before reduction, by drowning the reaction mass in water, filtering off the precipitate and drying at room temperature.

Example 3

Five parts of finely divided metal-free phthalocyanine and 3 parts of dibenzoyl peroxide were stirred for fifty hours at room temperature in 60 parts of chloroform. The mixture was filtered to remove unchanged pigment and the cake was washed with 50 parts of hot "Cellosolve." The combined filtrate and washings were reduced by heating them at 100° C. for fifteen minutes with 2 parts of ascorbic acid. The reduction yielded 3 parts of metal-free phthalocyanine.

Example 4

To 10 parts of finely divided zinc phthalocyanine in 1000 parts of chloroform were added 4.2 parts of dibenzoyl peroxide. The mixture was agitated at 26° C. for 2.5 hours and then filtered. A portion of the clear yellow solution was treated at boiling temperature for five minutes with 4 parts of ascorbic acid dissolved in methanol. During the heating, the yellow solution changed in color, first to green, then to blue and deposited zinc phthalocyanine as a blue precipitate.

Another portion of the yellow filtrate described above was reduced with aqueous sodium hydrosulfite at room temperature whereupon zinc phthalocyanine was likewise obtained.

Example 5

Fifty parts of metal-free phthalocyanine in the alpha form were milled in 1500 parts of ethylene glycolmonoethyl ether until the particles were 1 micron or smaller along the wider dimension. Twenty parts of dibenzoyl peroxide were added and the mixture was agitated for 2 hours. Unchanged pigment was removed by filtration and the filtrate, which was reddish-brown in color, was drowned in 15,000 parts of water. A brown solid separated, and was collected, washed with water and dried without heating. Upon reduction at 100° C. with 1 part of ascorbic acid in 50 parts of ethylene glycol-monoethyl ether, 1 part of the product yielded 0.43 part of metal-free phthalocyanine.

*Example 6*

Thirty parts of copper phthalocyanine were slurried in 257 parts of dry acetone. When the slurry had been brought to 30° C., 15 parts of 4,4'-dichloro-dibenzoyl peroxide were introduced. The mixture was agitated rapidly at 30° C. for forty-five minutes. The reaction mass was then filtered rapidly at suction and drowned into 3000 parts of a dilute solution of sodium carbonate in water. A brown solid precipitated. This solid was filtered off, washed with water until free of alkali and air dried, without heating. 7.5 parts of a tan powder were obtained.

When 1.000 part of this product was dissolved, together with 1 part of ascorbic acid, in 50 parts of "Cellosolve" and heated at 100° C. for fifteen minutes, 0.247 part of copper phthalocyanine were obtained.

*Example 7*

For forty-five minutes a mixture of 30 parts of copper phthalocyanine, 30 parts of a material consisting of 50% bis-(2,4-dichlorobenzoyl)-peroxide and 50% di-n-butyl phthalate (the latter serving as a diluent, to decrease the explosion hazard of the peroxide), and 316 parts of dry acetone was rapidly agitated at 20° C. The reaction mass was then rapidly filtered at suction and the dark brown filtrate drowned into 4000 parts of a dilute aqueous solution of sodium carbonate. The drowning mass was filtered at suction. A viscous grease-like oil was deposited on the filter. After being washed briefly with water this dark brown oil was air dried at room temperature. Its weight was 10.6 parts. It was contaminated with di-n-butyl phthalate. Upon reduction with ascorbic acid as in Example 6, copper phthalocyanine was obtained.

It will be understood that the details of the above examples may be varied within considerable limits, as indicated in the general discussion. Thus, in lieu of the particular solvents named in the examples, other convenient inert solvents may be employed, for instance acetone, benzene or chloroform.

In lieu of dibenzoyl peroxide and its mono- or dichloro derivatives, diacetyl peroxide may be employed.

Reduction to yield phthalocyanines may be accomplished with numerous reducing agents. At 100° C. or above, in aqueous "Cellosolve" (monoethyl ether of ethylene glycol), few agents fail to reduce the phthalocyanine oxidation products. Most agents function at room temperature. The temperature and preferred time of reduction with a given agent will vary depending upon the metal M in the pigment. The oxidation products of cobalt phthalocyanine reduce more slowly than the oxidation products of copper phthalocyanine, for example.

For best results, good contact should be afforded between the reducing agent and the phthalocyanine oxidation product.

Another important factor is the degree of fineness and uniformity of the pigment particles used as starting material. Thus, although the crudes of many phthalocyanines having relatively coarse particles react poorly, the corresponding phthalocyanines that have been reduced to pigmentary state by treatments such as acid pasting or salt-milling react much better.

The following additional examples will illustrate the application of my novel compounds to practical industrial problems.

*Example 8—Dyeing of textiles*

The oxidation product of Example 2 above is dissolved in glycol-monoethyl ether to produce a 6% solution, and padded onto cotton piece goods. The dried fabric is then boiled for twenty minutes in a 5% aqueous solution of potassium ferrocyanide. The dyeing so produced is finished first by boiling for twenty minutes in a 5% lactic acid solution and then by soaping at 180° F. in a 0.5% soap solution for twenty minutes. Deep blue shades, typical of copper phthalocyanine, are obtained. The dyeings have excellent light-fastness, do not crock, and exhibit good fastness to wet treatments, including the application of bleaching agents such as sodium hypochlorite.

When the same procedure is applied to "Dacron"—polyethylene-terephthalate piece goods, blue dyeings of unusual brilliance are obtained. They exhibit very good fastness to light and moderate fastness to washing.

A printing paste of the following composition is printed on cotton:

4 parts of the dried copper phthalocyanine oxidation product described in Example 1 hereinabove.
10 parts of urea.
10 parts of "Carbitol" (monoethyl ether of diethylene glycol).
16 parts of water.
50 parts of gum tragacanth (6% aqueous paste).
5 parts of sodium sulfite.
5 parts of sodium bisulfite.
—
100

The color is then developed by aging the printed goods for thirty minutes in a cottage steamer. The aged prints are rinsed in water, then soaped, again rinsed in water and finally dried.

The prints obtained exhibit the deep blue shade of copper phthalocyanine. They are very fast to light, do not crock, and are fast to wet treatments including the application of bleaching agents such as sodium hypochlorite.

When the copper phthalocyanine oxidation product in the above process is replaced by the similar oxidation product described in Example 2 above, similar results are obtained.

I claim as my invention:

1. Compounds of the general formula

wherein MPc designates the molecule of a phthalocyanine compound of the group consisting of metal-phthalocyanines and metal-free phthalocyanine, while COR designates the acyl radical of an organic carboxylic acid having a total of not less than 2 and not more than 7 C-atoms, said compounds being characterized by greater solubility in glycol-monoethyl ether than the corresponding phthalocyanine compound of formula MPc, and by generating a phthalocyanine pigment upon being treated with ascorbic acid.

2. A compound of the formula CuPc(—OBz)$_2$, wherein CuPc represents copper phthalocyanine while Bz represents an acyl radical of the group consisting of benzoyl and halogeno-benzoyl.

3. The reversible, solvent-soluble, addition product of copper phthalocyanine and dibenzoyl peroxide.

4. The reversible, solvent-soluble, addition product of copper phthalocyanine and p,p'-dichloro-dibenzoyl peroxide.

5. The reversible, solvent-soluble, addition product of copper phthalocyanine and bis(2,4-dichloro-benzoyl)-peroxide.

6. The reversible, solvent-soluble, addition product of metal-free phthalocyanine and dibenzoyl peroxide.

7. The process of producing a reversible, leuco derivative of a phthalocyanine coloring matter, which comprises reacting the same with a diacyl peroxide derived from an organic carboxylic acid having not less than 2 and not more than 7 C-atoms, the reaction being carried out in a water-miscible organic solvent which is inert to said diacyl peroxide.

8. The process of producing a reversible, leuco derivative of copper phthalocyanine which comprises reacting the same with a dibenzoyl peroxide selected from the group consisting of dibenzoyl peroxide and its halogen derivatives, the reaction being carried out in a water-miscible organic solvent which is inert to said dibenzoyl peroxide.

9. The process of producing an intermediate, leuco, derivative of copper phthalocyanine, capable of generating copper phthalocyanine upon treatment with ascorbic acid, which comprises reacting upon copper phthalocyanine with a dibenzoyl peroxide in a water-miscible organic solvent which is inert to dibenzoyl-peroxide, and recovering the leuco compound from the reaction mass by drowning the latter in water.

10. The process of producing a phthalocyanine coloring matter, which comprises reacting upon a compound as defined in claim 2 with a reducing agent selected from the group consisting of the alkali-metal sulfides, sulfites, bisulfites and hydrosulfites, zinc formaldehyde sulfoxylate, stannous chloride, sulfur dioxide, hydriodic acid, ascorbic acid, hydrazine hydrate, and hydroxylamine.

CHARLES JOHN PEDERSEN.

References Cited in the file of this patent

Adams et al., Organic Reactions, vol. 6, p. 471 (1951).